(12) United States Patent
Orlowski et al.

(10) Patent No.: US 11,560,023 B2
(45) Date of Patent: Jan. 24, 2023

(54) TIRE COMPRISING A CONDUCTIVE CORD

(71) Applicant: COMPAGNIE GENERALE DES ETABLISSEMENTS MICHELIN, Clermont-Ferrand (FR)

(72) Inventors: Claude Orlowski, Clermont-Ferrand (FR); Olivier Muhlhoff, Clermont-Ferrand (FR); Jośe Merino, Clermont-Ferrand (FR); Pascal Prost, Clermont-Ferrand (FR); Mattheiu Quadrini, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 306 days.

(21) Appl. No.: 16/955,563

(22) PCT Filed: Dec. 20, 2018

(86) PCT No.: PCT/IB2018/060420
§ 371 (c)(1),
(2) Date: Jun. 18, 2020

(87) PCT Pub. No.: WO2019/123363
PCT Pub. Date: Jun. 27, 2019

(65) Prior Publication Data
US 2020/0331307 A1    Oct. 22, 2020

(30) Foreign Application Priority Data
Dec. 22, 2017 (FR) ........................... 17/71425
Dec. 22, 2017 (FR) ........................... 17/71426

(51) Int. Cl.
*B60C 19/08* (2006.01)

(52) U.S. Cl.
CPC ................... *B60C 19/082* (2013.01)

(58) Field of Classification Search
CPC ..... B60C 19/08; B60C 19/082; B60C 19/084; B60C 19/086; B60C 19/088
See application file for complete search history.

(56) References Cited

U.S. PATENT DOCUMENTS 2,641,294 A   6/1953   Palacios
6,220,319 B1  4/2001   Reuter
(Continued)

FOREIGN PATENT DOCUMENTS

DE   19520996    12/1996
DE   102006050840  4/2008
(Continued)

OTHER PUBLICATIONS

Kim, English Machine Translation of KR 100285608, 2001 (Year: 2001).*

*Primary Examiner* — Robert C Dye
*Assistant Examiner* — Brendon Charles Darby
(74) *Attorney, Agent, or Firm* — Cozen O'Connor

(57) ABSTRACT

Tire (1) having sidewalls (2), a substantially electrically insulating crown block (7) and a substantially insulating tread (8), the tire (1) also having at least one conductive peg (21) that is oriented in the radial direction and positioned under the tread (8) of the tire so as to create an electrically conductive path between the ground and a rim on which the tire is able to be mounted.

7 Claims, 5 Drawing Sheets

(56) References Cited

Figure 1A:
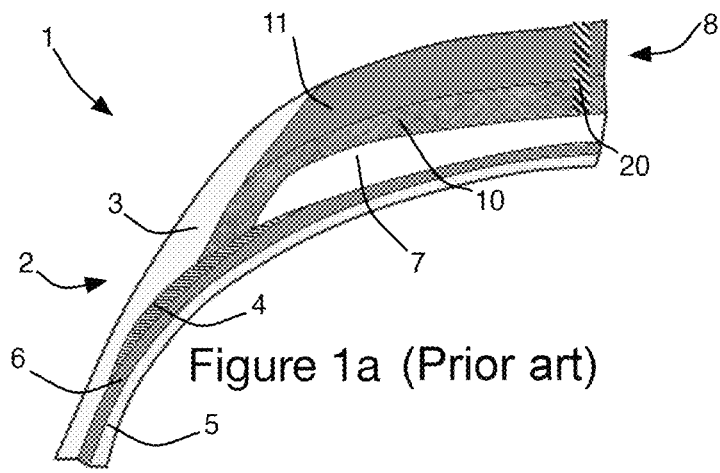

U.S. PATENT DOCUMENTS 6,951,233 B1 * 10/2005 Calvar .................. B60C 19/08
                                                                                  156/244.11
2004/0069386 A1     4/2004 Janajreh et al.

FOREIGN PATENT DOCUMENTS

| DE | 102011000361 | 8/2012 |
| EP | 0658452 | 6/1995 |
| EP | 1175992 | 1/2002 |
| EP | 1533144 | 5/2005 |
| EP | 1621365 | 2/2006 |
| EP | 1659005 | 5/2006 |
| EP | 2193934 | 6/2010 |
| EP | 2567833 | 3/2013 |
| FR | 2930192 | 10/2009 |
| FR | 3040017 | 2/2017 |
| KR | 100285608 | 1/2001 |
| KR | 285608 B1 * | 4/2001 |
| NL | 2006420 | 9/2012 |

* cited by examiner

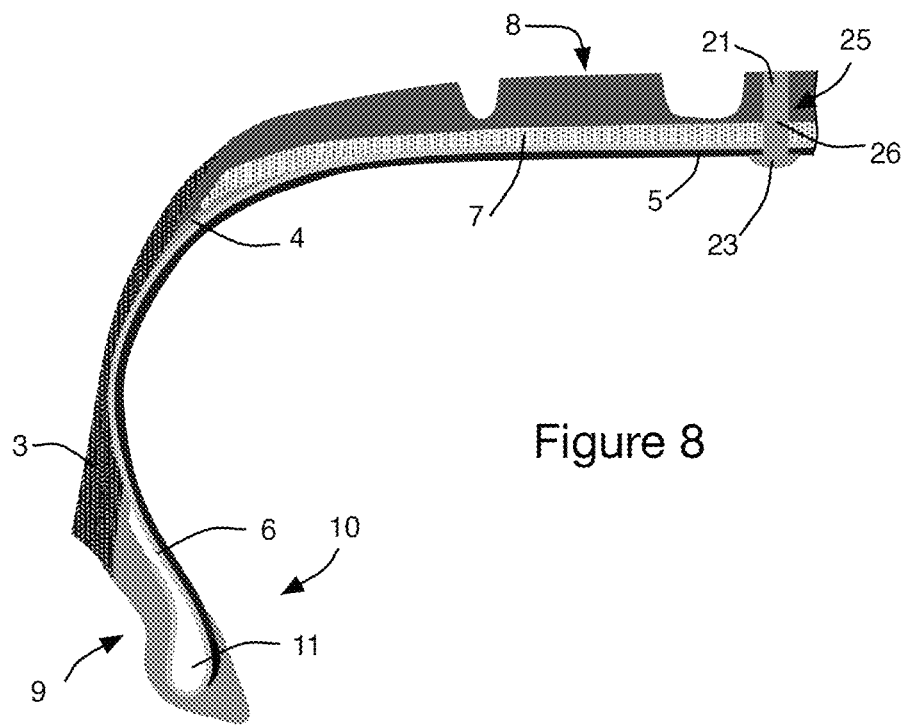
Figure 8
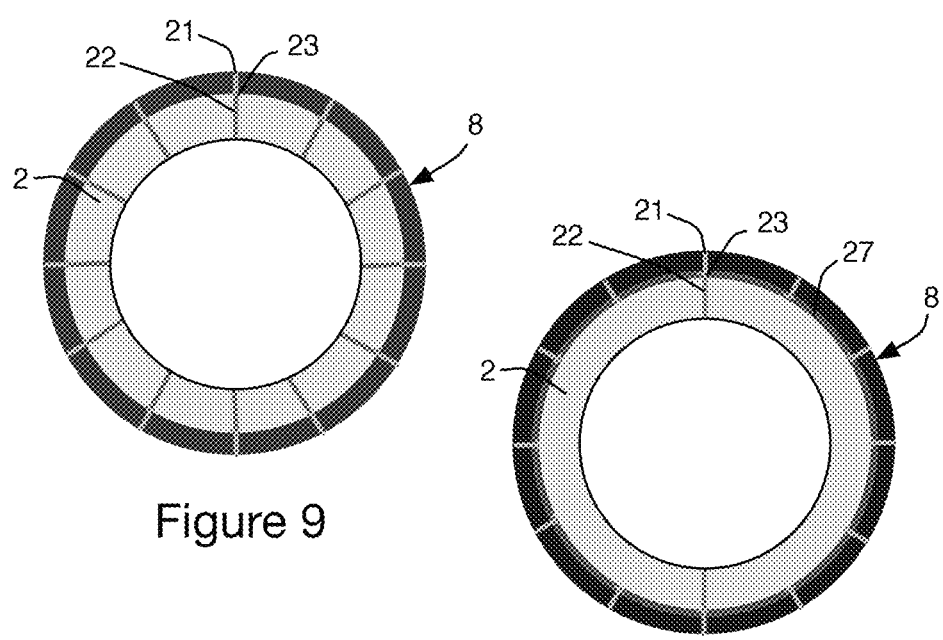
Figure 9
Figure 10

TIRE COMPRISING A CONDUCTIVE CORD

RELATED APPLICATIONS

This is a U.S. National Phase Application under 35 USC 371 of International Application PCT/IB2018/060420 filed on Dec. 20, 2018.

This application claims the priority of French application no. 17/71425 filed Dec. 22, 2017 and French application no. 17/71426 filed Dec. 22, 2017, the entire content of both of which are hereby incorporated by reference.

TECHNICAL FIELD OF THE INVENTION

The present invention relates to a tire made up of a carcass, a substantially insulating crown block and a substantially insulating tread. It relates more particularly to a tire of which the tread also has substantially conductive elements.

BACKGROUND OF THE INVENTION

Generally, the electrical resistivity of a tire on the road should be understood as being dependent on the intended use of the tire. Thus, certain standards set the maximum resistivity limits that a given tire may have.

The electrostatic charges stored by a moving vehicle have to be able to be evacuated from the wheel to the ground in order to make the tires comply with the specific standards. According to the standard WDK110, the tires have to have a minimum electrically conductive nature, where their conductivity is measured between the ground and the wheel. The maximum electrical resistance threshold is $1^E10$ ohms.

However, the increasingly common use of silica instead of carbon black within the elastomer compounds that make up the treads and skims in particular, has the consequence of making these tire portions insulating. This also goes for the compounds with a low content of carbon black. Consequently, and in order to attenuate this effect, various arrangements have been provided.

For example, the patent application DE19520996 relates to a tire having a tread, the first layer of which is substantially non-conductive, and one of the lower layers of which is made of conductive materials. Said substantially electrically conductive layer extends radially towards the outside of the contact surface in contact with the ground and is connected to a second conductive layer situated under the tread and connected to the region of the heel of the tire. This arrangement is electrically conductive.

The document EP1533144 describes a tire, the sidewall of which has an internal rubber layer, the electrical conductivity of which is high. This internal rubber strip extends radially towards the outside from the heel portion of the tire, as far as one of the base layers of the tread. Said rubber strip therefore makes it possible to provide increased electrical conductivity.

The document EP1175992 describes a method for manufacturing a tire tread provided with an electrically conductive layer. This layer has a ribbon of unvulcanized rubber, which is highly electrically conductive.

Similarly, the application EP2193934 relates to a tire, the tread of which contains an electrically conductive rubber strip. This conductive layer extends radially from a base layer of the tread towards the outside of the tread. This layer brings about electrical conductivity through the non-conductive layer of the tread.

According to these various solutions, electrical conductivity is ensured by the arrangement of conductive layers. Moreover, these architectures make it necessary to add layers specifically designed to provide conductivity.

Another way of controlling the electrical conductivity of the tire consists for example, according to the document DE102011000361, in a method intended to form an electrically conductive thread. This conductive thread is unwound continuously from a cylindrical reel, and is held in position by means of an elastic in the form of a mesh. The thread is conductive on account of its elastomer composition. The conductive thread is then affixed to a tire carcass insert in order to improve the conductivity of the lateral wall of the tire.

The application EP2567833 relates to a carcass ply comprising a plurality of bleeder cords and discharge cords that exhibit sufficient electrical conductivity to make it possible to conduct an electric charge from the structure of the tire as far as a part of the heel of the tire, via the carcass ply.

The document FR2930192 describes a tire reinforcing ply made up of a set of threads coated in a weakly electrically conductive rubber compound. Some of the threads are coated with a rubber compound of which the external layer is electrically conductive. Other threads are coated with a rubber compound of which the external layer is very weakly electrically conductive. The set of threads is interposed so as to form one or more electrically conductive passages between the upper part and the lower part of the ply.

The application EP1621365 relates to a pneumatic rubber tire containing at least one electrically conductive cord. The electrically conductive cord extends from an external surface of the bead of the tire to an internal layer of the tread. Such an arrangement makes it possible to create an electrically conductive passage between the external surface of the rim of the tire and the internal base layer of the tread. The cord consists of at least one conductive metal filament wound in a spiral around a core disposed at the centre of at least one organic fibre.

The documents cited above relate to controlling the electrical conductivity of tires by fitting threads or cords that are materially electrically conductive. These threads and cords extend generally inside the tire along different walls and involve particular architectures.

Another electrically conductive arrangement is for example, as described by the document DE102006050840, a tire having a tread consisting of a conductive portion and a coil consisting of layers of non-conductive materials made of a composite compound. The outermost layer is made up of electrically conductive materials between its outer part and its lower part in order to produce an electrically conductive passage.

The application EP0658452 likewise relates to a tire having a conductive insert. The conductive insert is incorporated into the tread of the tire, and extends in an annular configuration, circumferentially around the tread. The conductive insert extends through the width of the tread as far as the exterior of the tread. The insert exhibits sufficient electrical conductivity to allow the electrostatic charges stored by the vehicle to be evacuated towards the ground through the tire.

The document U.S. Pat. No. 6,220,319 describes a tire made of rubber having high electrical resistance. The tread includes an electrically conductive filament that extends from the inner surface to the outer surface of the tread. An electrically conductive passage is created through the tread.

The application US2004069386 relates to a pneumatic tire, the tread of which is electrically conductive. The tread is designed with an electrically resistant rubber composition and a conductive passage located in the belt of the tire. In a variant, a conductive passage extends from the belt layer as far as a section of the carcass of the tire.

The above-described documents describe means for controlling the electrical conductivity of the tire by fitting an electrically conductive moulded insert, arranged through the tread.

The document EP1659005 describes a tire, the sidewalls of which consist of very weakly electrically conductive materials, and are furthermore provided with a conductive strip with a small thickness and a small width that is made with electrically conductive materials and provides the link between the crown region and the bottom region of the tire, in order to ensure the transmission of electric charges towards the wheel of the vehicle. Moreover, the conductive strip is arranged in the sidewall, in the immediate vicinity of the axially outer layer of the sidewall. This embodiment makes it possible to ensure the function of electrical conduction, but involves the implementation of a specific architecture to allow the integration of the conductive strips without impairing the durability of the product.

The document FR3040017 describes a tire comprising a carcass, a substantially insulating crown block, an internal tread layer radially on the inside of the substantially insulating crown, and a substantially conductive tongue that is made of elastomer materials and arranged radially through the tread, the tire also comprising at least one conductive thread extending between the radially inner end of the tongue and the closest conductive layer. Since the conductive layer remains fairly far away from the tongue, the conductive thread covers a fairly large distance in the tire in order to connect the two parts together.

The document NL2006420 describes a tire having a weakly conductive tread having a conductive internal layer connected to the external surface of the tread by a plurality of conical pegs implanted in the tread, the wide part of the cone being able to come into contact with the ground during running. The fitting of the pegs includes a step of recessing the tread to form housings intended for the positioning of the pegs. Such an architecture involves the formation of stress concentration zones at the tips of the cones of the peg housings. These stress concentration zones are liable to create cracks in the tread.

The document US2004069386 describes a tire in which one or more radial conductive bridges are provided so as to ensure good conductivity between the external layer of the tread and the conductive internal layers of the tire. The bridges are entirely disposed in the internal volume of the tread. In order to ensure the conductivity through the plies with reinforcers, bridges having multiple sections are provided. This type of architecture is particularly complex and costly to implement.

The document U.S. Pat. No. 2,641,294 describes a tire provided with threads extending between the bases of the sidewalls and the central region of the tread. These threads are provided to ensure good electrical conductivity. The ends of the threads pass through the thread in order to make contact with the ground. A variant provides for the implantation of conductive metal pegs connected to the threads and inserted into the tread, with a protruding portion. Such an architecture involves the formation of stress concentration zones in the enlarged body of the pegs. These stress concentration zones are liable to create cracks in the tread.

Therefore, the prior art reveals a large number of arrangements for transferring electric charges from the wheel of a vehicle to the ground. For all that, regardless of the way in which the electrical conductivity is controlled, the manufacture of the various tires remains complex and costly as regards the arrangement of the various layers, the fitting of a conductive cord, and the manufacture of a moulded insert in the tread.

Embodiments of the invention provide various technical means for remedying these various drawbacks.

SUMMARY OF THE INVENTION

First of all, a first objective of the invention is to provide a tire architecture that complies with safety standards.

A further objective of the invention is to maintain the electrical conductivity in the presence of different components, in particular insulating components, of a tire.

A further objective of the invention consists in providing a tire that has good electrical conductivity characteristics, with a minimum impact on the mechanical characteristics of this tire.

Finally, another objective of the invention consists in providing a simple method for installing conductive elements between certain layers of the tire.

To this end, an embodiment of the invention provides a tire comprising sidewalls, a substantially electrically insulating crown block and a substantially insulating tread, the tire also comprising at least one conductive peg that is oriented in the radial direction and positioned under the tread of the tire, said peg cooperating with a conductive internal element of the tire that is able to ensure electrical conductivity between the peg(s) and the bottom region of the tire that is able to be in contact with a rim on which said tire can be mounted, said conductive peg being placed in a housing flush with the internal surface of the cavity of the tire, and said conductive peg having a peg head arranged in the continuation of a peg shank, said peg head being disposed under the tread of the tire, advantageously outside the housing.

The conductive peg ensures electrical continuity between the ground and the rim. The implementation thereof has no significant impact on the architecture and the manufacture of the tire. It is thus possible to use this approach to retrospectively correct implementations in which insufficient conductivity is found. Moreover, the conductive peg has a neutral mechanical impact on the tire. Its mass and its thickness are very low, such that the peg has no perceptible effect on the tire, unlike the strip of elastomer material of the prior art, which creates a region of overthickness and increases the mass of the tire.

The peg(s) ensure conductivity either between the ground and an internal conductive element or between a conductive ring and an internal conductive element, the conductive element cooperating electrically with the pegs. This conductive element extends between the conductive pegs and a conductive bottom region of the tire, ensuring conductivity towards a rim on which the tire is mounted.

According to an advantageous embodiment, the conductive internal element is one or a plurality of conductive cords. The conductive cord is for example a filament of conductive material or paint or other conductive coating, applied to the interior of the tire.

The conductive peg and the cord can be fitted on a tire that has already been manufactured and vulcanized so as to obtain electrical conductivity for the tires having insulating components.

According to various embodiments, the conductive cord extends over the inner face of the tire as far as beneath the heel or as far as the region of the bead wire. In the first case, the cord ensures conductivity as far as the rim on which the tire is mounted. In the second case, an intermediate conductive layer, in the bottom region, ensures conductivity between the cord and the rim on which the tire is mounted.

In a variant, the conductive internal element is an internal layer of the tire, preferably a sealing layer or the carcass of the tire. The internal layer is a layer conventionally incorporated during the manufacture of a tire. As the case may be, this internal layer may be conductive, for example by virtue of fillers of the carbon black type or some other conductor. The presence of a conductive internal layer avoids the need to add a conductive cord and simplifies implementation.

Advantageously, the conductive cord and/or the conductive peg consists of an elastomer compound comprising a conductive element, or of conductive thermoplastic elastomer. The thermoplastic elastomer can be filled with carbon black or some other conductor, for example graphite, graphene, or a carbon nanotube. The conductive thermoplastic elastomer can also be used to make the conductive peg.

In a variant, the conductive cord consists of conductive paint.

The conductive cord can also consist of SBS, SIS, SIBS, SEBS or TPU. This characteristic makes it possible to apply the cord after vulcanization if necessary, since these materials do not need to be cured.

According to an advantageous embodiment, an internal conductive ring, advantageously made of elastomer material, electrically connects all of the pegs and leads onto the radially outer surface of the tread.

Advantageously, the conductive peg is extended on each side of the conductive ring. This ensures excellent conductivity. According to an advantageous embodiment, the conductive peg is extended radially on the outside along the conductive ring.

According to another embodiment, a plurality of pegs are distributed circumferentially in the tread of the tire and lead onto the radially outer surface of the tread.

According to an advantageous embodiment, the peg head has a diameter at least more than 1.5 times the diameter of the shank of the peg, and more preferably at least more than twice the diameter of the shank of the peg.

The invention also provides a method for producing a tire as described above, the tread of which is not conductive, so as to make said tire conductive, comprising the steps of:
i) forming at least one housing in the tread of the tire in order to dispose at least one peg therein;
ii) positioning in each housing at least one conductive peg having a peg head, such that the head of the peg is under the tread;
iii) vulcanizing said tire or locally vulcanizing the peg.

According to an advantageous embodiment, the method also comprises a step of fitting at least one conductive cord in the interior of the tire.

According to another advantageous embodiment, the method also comprises a step of fitting an internal peripheral ring.

DETAILED DESCRIPTION OF THE DRAWINGS

Figure 1B:
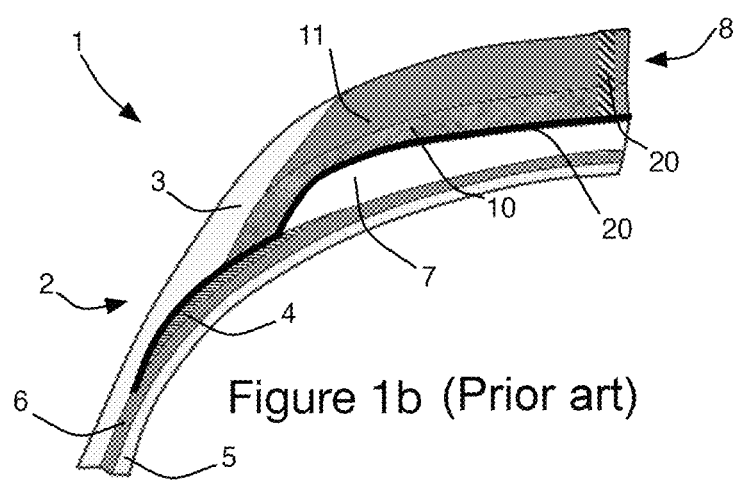
Figure 2:
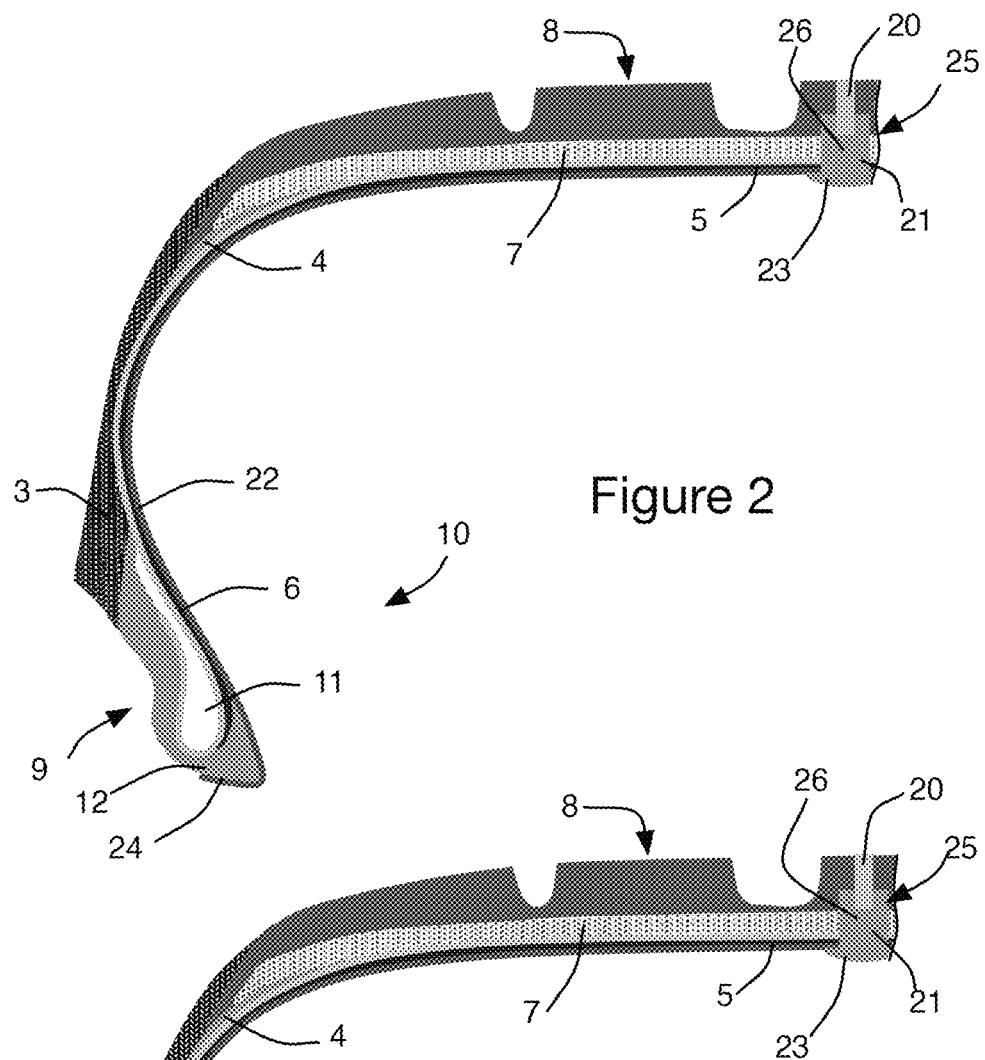
Figure 3:
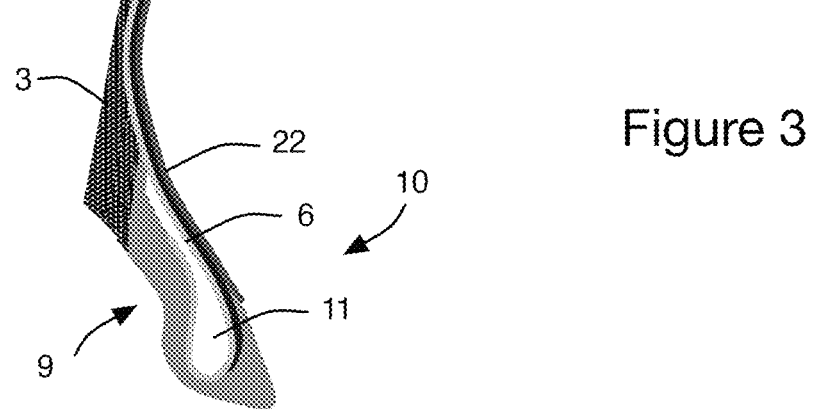
Figure 4:
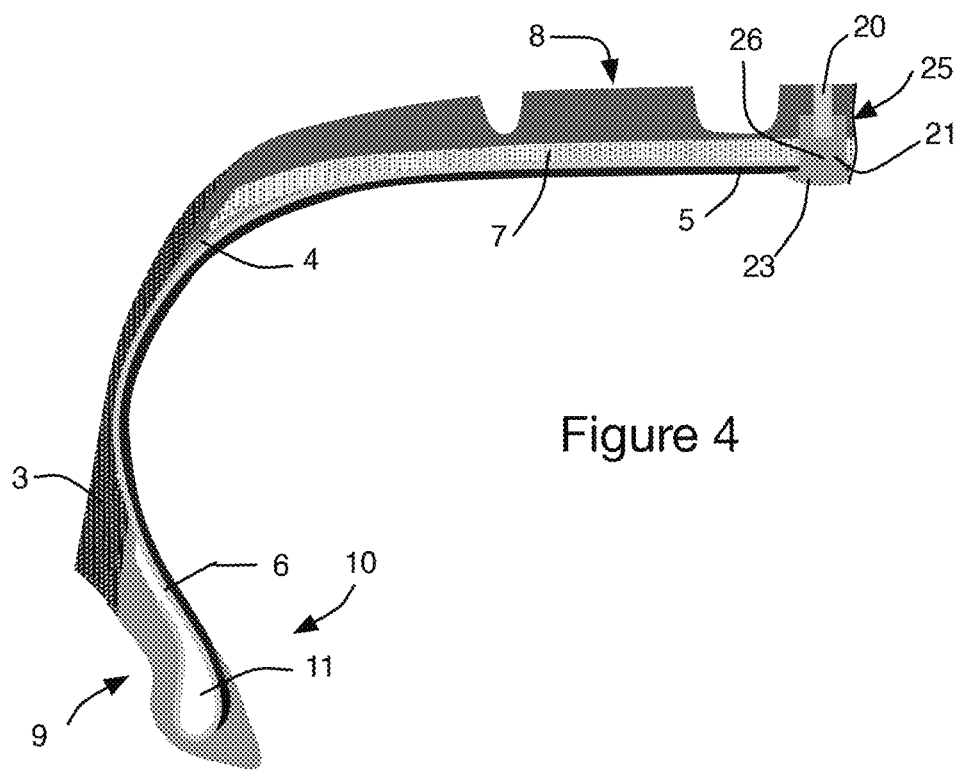
Figure 5A:
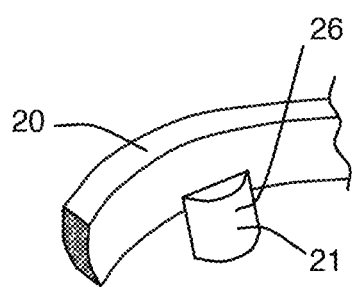
Figure 5B:
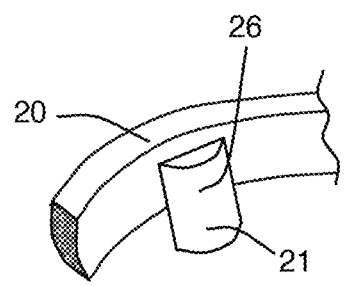
Figure 6:
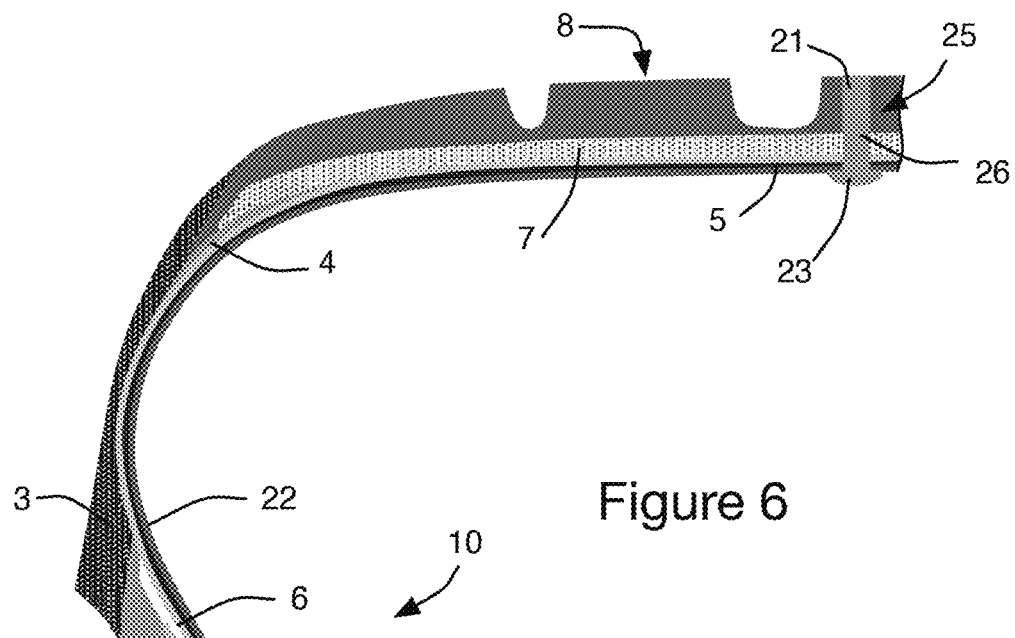
Figure 7:
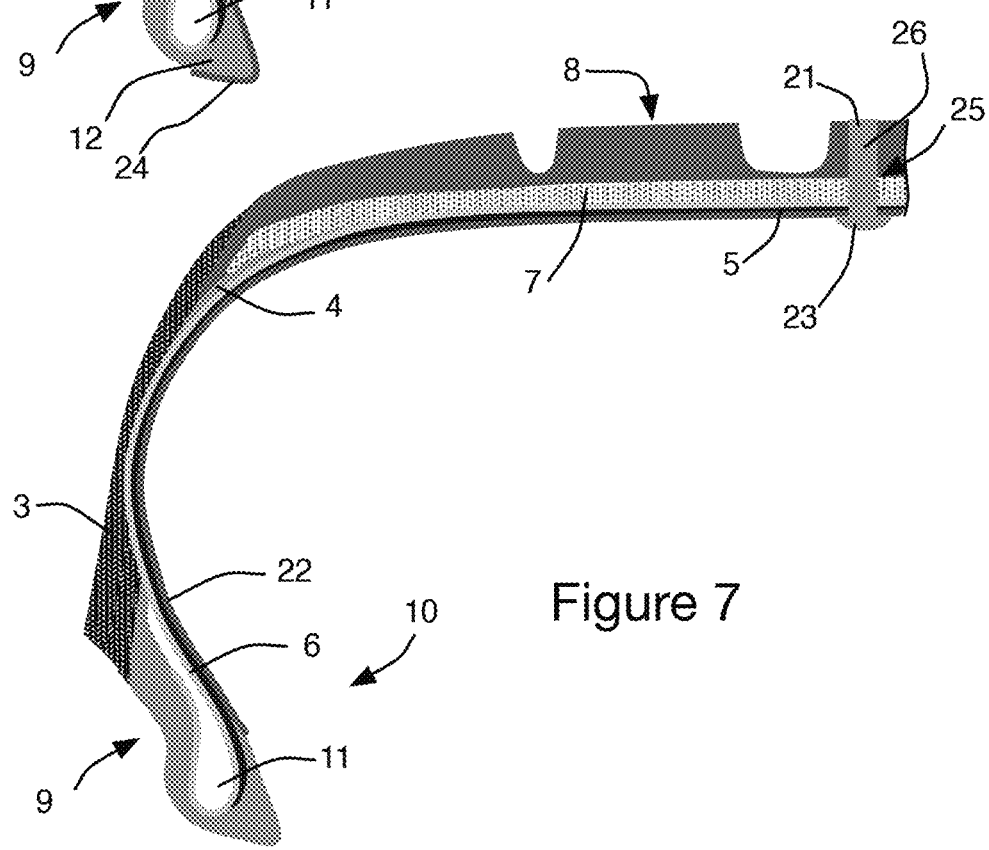

All the embodiment details are given in the following description, which is supplemented by FIGS. 1 to 5b, which are given solely by way of non-limiting examples and in which:
FIGS. 1a and 1b are cross-sectional views of a portion of a tire according to the prior art;

FIG. 2 is a cross section of a transverse section of a first example of a tire according to an embodiment of the invention;
FIG. 3 is a cross section of the same portion of a tire according to another exemplary embodiment of the invention;
FIG. 4 is a cross section of the same portion of a tire according to yet another exemplary embodiment of the invention;
FIGS. 5a and 5b illustrate different examples of fitting the conductive peg in relation to the conductive ring;
FIG. 6 is a cross section of a transverse section of another example of a tire;
FIG. 7 is a cross section of the same portion of a tire according to yet another exemplary embodiment;
FIG. 8 is a cross section of the same portion of a tire according to yet another exemplary embodiment;
FIG. 9 is an axial cross section of an exemplary embodiment having a cord for each peg;
FIG. 10 is an axial cross section of an exemplary embodiment having an internal conductive ring providing the electrical connection between the pegs and at least one cord.

DETAILED DESCRIPTION OF THE INVENTION

Detailed Description of the Drawings

The expression "substantially insulating" means electrical conductivity having the effect that the tire would be capable of approaching the minimum conductivity threshold as defined by the abovementioned standard WDK110.

A "peg" is understood to be an element which, after being installed in the tire, extends circumferentially over a very short distance with respect to the perimeter of the tread of the tire, and, transversely, likewise extends transversely over a very short distance with respect to the width of the tread.

Embodiment in FIGS. 2 to 5b

FIG. 1 illustrates an exemplary embodiment of a tire of known type, in which the electrical conductivity through the insulating tread is ensured by a conductive ring 20 passing through the tread 8.

The conductive ring 20 is made up of elastomer compounds, passes through the tread 8 and ensures electrical conductivity from the conductive internal layers to the ground. Such an arrangement consequently makes it possible to obtain a conductive passage between the ground and the wheel of the vehicle since the crown block 8 and/or the shoulder reinforcer 4 of the tire, and/or the carcass 6, and also the elastomer material in contact with the rim, are substantially conductive.

However, for certain tire architectures, such an arrangement cannot ensure such electrical continuity. The increasingly frequent use of elastomer compounds comprising silica to form internal layers of the tire makes the regions in question less conductive. FIGS. 2, 3 and 4 illustrate for example a tire in which the crown block 8 is insulating. In this case, since the conductive ring 20 is no longer in contact with a conductive elastomer compound, electrical continuity is no longer ensured.

The introduction of a conductive peg 21 under the tread 8 of the tire 1, and in contact with the conductive ring 20, makes it possible to connect the ring 20 to the closest conductive elastomer compound.

FIG. 2 illustrates an embodiment in which the electrical continuity between the conductive peg 21 and the rim is ensured by a cord 22 extending along the internal wall of the sidewall 2 as far as the bead 9 of the tire. As illustrated in this example, the cord 22 comprises a portion 24 turned up under the heel 12 of the tire. This portion 24 makes it possible to ensure direct contact with the rim, for example when the entire sidewall of the tire consists of non-conductive materials. Such an architecture promotes the conductivity of the tire 1 towards the ground through the crown block 7, along the sidewall, as far as the rim.

FIG. 3 shows an embodiment variant in which the conductive cord 22 extends over the internal wall of the sidewall 2 as far as the region of the bead wire 11. This latter embodiment is suitable for example when the elastomer compound used to form the bottom region, in particular the bead 9, is conductive, thereby ensuring the electrical conductivity between the bottom region 10 and the rim on which the tire is mounted.

Adding a conductive cord 22 in contact with the conductive ring 20, arranged according to the schematic depictions in FIGS. 2 and 3, makes it possible to ensure conductivity from the rim, then as far as the crown via the conductive cord(s), and through the tread via the conductive ring 20 as far as the ground.

FIG. 4 illustrates an embodiment variant in which the electrical continuity between the conductive peg 21 and the rim is ensured by a conductive internal layer 5 arranged along the internal wall of the tire, from one bead 9 to the other, passing over the sidewalls 2 to the crown region. Such an architecture allows conductivity between the conductive peg 21 and the bottom region of the tire. A, likewise conductive, material of the bottom region 10 then ensures conductivity from the internal layer 5 as far as the rim on which the tire is mounted.

FIGS. 5a and 5b illustrate examples of the manner of electrical cooperation between the peripheral ring 20 and the peg 21. In the example in FIG. 5a, the peg 21 is in contact with the radially inner portion of the ring 20. In the example in FIG. 5b, the peg 21 is in contact with the radially inner portion of the ring 20 and is extended radially on the outside along at least one of the sides of the ring, in order in this way to ensure better electrical conductivity.

Production Method

In order to manufacture a tire with one or more pegs 21 as described above, a method for producing a tire provides the following steps, consisting first of all in piercing the interior of the tread of the tire with the aid of a suitable tool. The following step consists in injecting a conductive peg into the hole produced. Injection is effected from the cavity of the tire. If necessary, one or more conductive cords are then applied along at least one sidewall. Next, as the case may be, if the tire is in the unvulcanized state, it passes to the moulding/curing step, or if the tire is already vulcanized, local crosslinking of the pegs and/or cords is carried out. By virtue of these different possibilities, it is possible to configure as described above, in order to make a newly manufactured tire or a previously manufactured tire conductive.

Embodiment in FIGS. 6 to 10

As presented in the exemplary embodiments in FIGS. 6, 7 and 8, the tire 1 comprises a plurality of conductive pegs 21 that are oriented in the radial direction and distributed circumferentially in the tread of the tire.

Given that the tread is insulating, these pegs make it possible to ensure electrical conductivity between the ground and the internal portion of the tire.

The number and the distribution of the inserts of the circumferential course of the tread are provided so as to make it possible for there always to be at least one peg in contact with the ground. Preferably, at least twelve pegs are provided, i.e. one peg every 30 degrees. In a variant, a larger number of pegs are provided, for example 20 pegs, i.e. one peg every 18 degrees.

FIG. 6 illustrates an embodiment in which the electrical continuity between the pegs 21 and the rim is ensured by one or preferably a plurality of cords 22 extending along the internal wall of the sidewall 2 as far as the bead 9 of the tire. As illustrated in this example, the cord 22 comprises a portion 24 turned up under the heel 12 of the tire. This portion 24 makes it possible to ensure direct contact with the rim, for example when the entire sidewall of the tire consists of non-conductive materials. Such an architecture promotes the conductivity of the tire 1 towards the ground through the crown block 7, along the sidewall, as far as the rim.

FIG. 7 shows an embodiment variant in which the conductive cords 22 extend over the internal wall of the sidewall 2 as far as the region of the bead wire 11. This latter embodiment is suitable for example when the elastomer compound used to form the bottom region, in particular the bead 9, is conductive, thereby ensuring the electrical conductivity between the bottom region 10 and the rim on which the tire is mounted.

Adding one or more conductive cords 22 in contact with the conductive pegs 21, arranged according to the schematic depictions in FIGS. 6 and 7, makes it possible to ensure conductivity from the rim, then as far as the crown via the conductive cord(s), and through the tread via the pegs 21 as far as the ground.

FIG. 8 illustrates an embodiment variant in which the electrical continuity between the pegs 21 and the rim is ensured by a conductive internal layer 5 arranged along the internal wall of the tire, from one bead 9 to the other, passing over the sidewalls 2 to the crown region. Such an architecture allows conductivity between the pegs 21 and the bottom region of the tire. A, likewise conductive, material of the bottom region 10 then ensures conductivity from the internal layer 5 as far as the rim on which the tire is mounted.

FIG. 9 illustrates by way of a meridian section an example of the angular distribution of pegs 21 and cords 22 arranged in the continuation of the pegs. This arrangement provides a cord aligned in the continuation of each of the pegs.

FIG. 10 illustrates another exemplary embodiment, in which the tire comprises an internal conductive ring 27 connecting at least some and preferably all of the pegs 21. In such an arrangement, the electrical continuity towards the bottom region can be ensured by a single conductive cord 22 connecting the internal ring 20 to the bottom region of the tire. Use is preferably made of at least two cords, which are angularly equidistant, to ensure continuity if a cord becomes damaged.

Production Method

In order to manufacture a tire with one or more pegs 21 as described above, a method for producing a tire provides the following steps, consisting first of all in making a plurality of radial openings at multiple positions provided along the tread, with the aid of a suitable tool. Next, the following step consists in injecting a conductive peg into each of the openings. If necessary, an internal conductive ring is positioned.

If necessary, one or more conductive cords are then applied along at least one sidewall. Next, as the case may be, if the tire is in the unvulcanized state, it passes to the moulding/curing step, or if the tire is already vulcanized, local crosslinking of the pegs and/or cords is carried out.

By virtue of these different possibilities, it is possible to configure as described above, in order to make a newly manufactured tire or a previously manufactured tire conductive.

Characteristics of the Pegs

In the different embodiments illustrated, the conductive pegs 21 have a shank 26 in the form of an elongate cylindrical body, surmounted by a peg head 23 with a diameter greater than that of the shank. The diameter of the head 23 corresponds to at least 1.5 times, and preferably at least twice the diameter of the shank. The internal face of the head is substantially flat so as to bear properly against the internal face of the cavity of the tire. In the examples illustrated, the external profile of the head is rounded. In a variant, the head has a conical profile. In the examples illustrated, the pegs are made of conductive thermoplastic elastomer (TPE), i.e. of which the electrical conductivity is at least five times, and preferably at least ten times, greater than that of the adjacent region of the tread. The thermoplastic elastomer can be filled with carbon black or some other conductor, for example graphite, graphene, or a carbon nanotube.

According to various embodiments, the peg head 23 may or may not protrude from the internal surface of the tire. The peg head 23 may form a cavity towards the inside or a protuberance towards the outside, which may have more or less the shape of a spherical cap. The peg head may also be located in the continuation of the internal surface of the tire.

The resistivity of a material is evaluated with a test specimen using the expression: Resistivity (0 cm)=β=RS/L, in which R corresponds to the resistance measured in ohms (Ω), S corresponds to the cross-sectional area of the test specimen in $cm^2$, and L corresponds to the length of the test specimen in cm.

The resistivity of the material of the peg is log ρ<4 and preferably log ρ<3, and even more preferably log ρ<2.5.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

| | Reference numerals employed in the figures |
|---|---|
| 1 | Tire |
| 2 | Sidewall |
| 3 | Sidewall external layer |
| 4 | Shoulder reinforcer |
| 5 | Internal layer (serving preferably as a sealing layer layer) |
| 6 | Carcass |
| 7 | Crown block |
| 8 | Tread |
| 9 | Bead |
| 10 | Bottom region of the tire |
| 11 | Bead wire |
| 12 | Heel |
| 20 | Peripheral conductive ring |
| 21 | Conductive peg |
| 22 | Conductive cord |
| 23 | Head of the peg |
| 24 | Turned-up portion of the cord |
| 25 | Peg housing |
| 26 | Peg shank |
| 27 | Internal conductive ring |

The invention claimed is:

1. A tire comprising sidewalls, a substantially electrically insulating crown block and a substantially insulating tread, the tire also comprising at least one conductive peg that is oriented in the radial direction and positioned under the tread of the tire so as to create an electrically conductive path between the ground and a rim on which the tire is able to be mounted, said peg cooperating with a conductive internal element of the tire that is able to ensure electrical conductivity between the peg and the bottom region of the tire that is able to be in contact with a rim on which said tire can be mounted, wherein said conductive peg is placed in a housing flush with the internal surface of the cavity of the tire, said conductive peg has a peg head arranged in the continuation of a peg shank and is disposed under the tread of the tire, outside the housing, and wherein the peg shank and the peg head have circular profiles, each with a different diameter, and wherein the diameter of the peg head is at least more than 1.5 times the diameter of the peg shank.

2. The tire of claim 1, wherein the conductive internal element is one or a plurality of conductive cords.

3. The tire of claim 2, wherein the conductive cord extends over the interior face of the tire as far as the region of the bead wire, where a conductive element is located that provides the electrical connection to a rim, or as far as beneath the heel.

4. The tire of claim 1, wherein the conductive internal element is an internal layer of the tire.

5. The tire of claim 1, wherein the conductive peg comprises a plurality of pegs, and also comprises a peripheral conductive ring that electrically connects all of the pegs and leads onto the radially outer surface of the tread.

6. The tire of claim 5, wherein the conductive pegs are extended axially on each side of the conductive ring.

7. The tire of claim 1, wherein the conductive peg comprises at least ten pegs that are distributed circumferentially at an equal angular distance from one another in the tread of the tire and lead onto the radially outer surface of the tread.

* * * * *